(12) United States Patent
Wen et al.

(10) Patent No.: US 9,044,735 B2
(45) Date of Patent: Jun. 2, 2015

(54) DNA EXTRACTION USING A PHOTO-POLYMERIZED MONOLITH IN A CAPILLARY

(75) Inventors: Jian Wen, Quincy, MA (US); Jerome P. Ferrance, Charlottesville, VA (US); James P. Landers, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 1276 days.

(21) Appl. No.: 12/892,618

(22) Filed: Sep. 28, 2010

(65) Prior Publication Data

US 2011/0086181 A1    Apr. 14, 2011

Related U.S. Application Data

(63) Continuation of application No. 11/885,181, filed as application No. PCT/US2006/006845 on Feb. 28, 2006, now Pat. No. 7,815,802.

(60) Provisional application No. 60/740,977, filed on Nov. 30, 2005, provisional application No. 60/656,998, filed on Feb. 28, 2005.

(51) Int. Cl.
| | |
|---|---|
| *B01J 20/10* | (2006.01) |
| *B01J 20/26* | (2006.01) |
| *B01J 20/28* | (2006.01) |
| *B01J 20/32* | (2006.01) |

(52) U.S. Cl.
CPC .............. *B01J 20/103* (2013.01); *B01J 20/26* (2013.01); *B01J 20/264* (2013.01); *B01J 20/28014* (2013.01); *B01J 20/28042* (2013.01); *B01J 20/3278* (2013.01); *B01J 2220/58* (2013.01); *B01J 2220/82* (2013.01)

(58) Field of Classification Search
CPC ........ B01J 20/103; B01J 20/26; B01J 20/264; B01J 20/28042; B01J 20/3278; B01J 20/28014; B01J 2220/82; B01J 2220/58
USPC ........... 210/635, 656, 658, 659, 198.2, 198.3; 95/82, 88; 96/101; 536/23.1
See application file for complete search history.

(56) References Cited

U.S. PATENT DOCUMENTS

| | | |
|---|---|---|
| 6,866,785 B2 | 3/2005 | Zare et al. |
| 6,887,384 B1 | 5/2005 | Frechet et al. |

(Continued)

FOREIGN PATENT DOCUMENTS

WO    WO-2006093865 A1    9/2006

OTHER PUBLICATIONS

"U.S. Appl. No. 11/885,181, Notice of Allowance mailed Jun. 11, 2010", 6 pgs.

(Continued)

*Primary Examiner* — Ernest G Therkorn
(74) *Attorney, Agent, or Firm* — Schwegman Lundberg & Woessner, P.A.

(57) ABSTRACT

The present invention relates to the fabrication of a grafted, UV photo-polymerized silica-based monolithic column and the use of such column for the extraction of DNA. In one embodiment, a method is provided for fabricating a silica-based monolithic column, wherein a vessel is filled with a polymerization mixture that is formed into monolithic solid phase for DNA extraction through in situ photo-polymerization.

20 Claims, 7 Drawing Sheets

(56) References Cited

U.S. PATENT DOCUMENTS

| | | |
|---|---|---|
| 7,815,802 B2 | 10/2010 | Wen et al. |
| 2003/0062308 A1 | 4/2003 | Zare et al. |
| 2003/0062310 A1 | 4/2003 | Zare et al. |
| 2006/0078983 A1 | 4/2006 | Lau |
| 2007/0284308 A1 | 12/2007 | Zare et al. |

OTHER PUBLICATIONS

"European Application Serial No. 06736213.7, Extended European Search Report mailed on Jul. 5, 2010", 7 pgs.

"European Application Serial No. 06736213.7, Response filed Jan. 24, 2011 to EP Search Report mailed Jul. 5, 2010", 6 pgs.

"International Application Serial No. PCT/US2006/006845, International Preliminary Examination Report mailed Sep. 11, 2007", 4 pgs.

"International Application Serial No. PCT/US2006/006845, International Search Report and Written Opinion mailed Jun. 22, 2006", 4 pgs.

Wen, et al., "DNA Extraction Using a Tetramethyl Orthosilicate-Grafted Photopolymerized Monolithic Solid Phase," Analytical Chemistry, 2006, pp. 1673-1681, vol. 78, No. 5, American Chemical Society, Washington, DC, USA.

DNA EXTRACTION USING A PHOTO-POLYMERIZED MONOLITH IN A CAPILLARY

The present invention is a continuation of U.S. patent application Ser. No. 11/885,181, filed Sep. 8, 2008, now U.S. Pat. No. 7,815,802, which is a 371 of PCT/US06/06845 filed Feb. 28, 2006, and, which claims priority from U.S. Provisional Application Ser. No. 60/656,998, filed Feb 28, 2005, and from U.S. Provisional Application Ser. No. 60/740,977, filed Nov. 30, 2005, both of which are incorporated herein by reference herein in their entirety.

BACKGROUND OF THE INVENTION

DNA extraction is a sample preparation technique often utilized in clinical and forensic applications to purify and concentrate DNA for genetic analysis from small volume samples that typically are dilute or biologically complex, e.g. blood. Significant effort has been invested in the last two decades into devising methods that reduce the amount of sample required for genetic analysis, often to address the needs of clinical and forensic communities. One such method has involved adapting traditional genetic analysis methodologies to a microscale format. The miniaturization of sample preparation techniques, including DNA extraction, has been included in the move towards microscale analysis. Such miniaturization has been found to minimize sample handling and contamination, as well as helping to reduce analysis time. Solid phase extraction (SPE), the current DNA sample preparation technique of choice in clinical and forensic laboratories, is among the techniques that have been miniaturized for microscale analysis. Micro-SPE (μSPE) columns have been developed in both capillaries and microdevices such as microfluidic chips (Tian et al., *Anal. Biochem.* 2000, 283, 175-191; Wolfe et. al. *Electrophoresis* 2002, 23, 727-733; Breadmore et al. *Anal. Chem,* 2003, 75, 1880-1886).

In the presence of a chaotropic solution, nucleic acids bind avidly to a hydrophilic silica surface. This has been described previously and represents the chemical basis for the most common form of SPE for DNA samples. The most widely used silica-based SPE column for DNA extraction is fabricated using silica-based particles or beads (Melzak et al. *J. Colloid Interf. Sci.* 1996, 181, 635-644). DNA extraction and purification has been achieved with good efficiency in microscale formats utilizing silica beads in μSPE columns. Issues of reproducibility, however, have resulted from the inability to completely immobilize the silica beads within the column (Wolfe et al. *Electrophoresis* 2002, 23, 727-733). This problem has been addressed using the dual weir-type approach described in *Anal. Chem.* 2000, 72, 585-590 and a bead immobilization method described in *Anal. Chem.* 2003, 75, 1880-1886. In the latter method, silica beads were packed into the microchannels of a microfluidic glass chip and immobilized with a "nano-glue" comprised of a tetraethoxyorthosilicate (TEOS) based sol-gel. This provided a continuous and stable solid phase μSPE column for DNA extraction.

Despite improvements made to silica bead based μSPE columns, fabrication of this type of solid phase column within microdevices, particularly through bead packing, has several distinct disadvantages. First, the additional processes involved in filling microchannels on devices such as microfluidic chips with silica beads increases the fabrication time for such solid phase columns. Second, when using microfluidic chips for extraction, chip-to-chip extraction reproducibility, while somewhat improved through bead immobilization, continues to be a significant problem. Third, while the surface area available for DNA binding is enhanced by decreasing the bead diameter, smaller diameter beads (e.g., 5 μm) are more difficult to contain, resulting in higher back pressures which limit μSPE columns in microdevices to relatively low flow rates and low binding capacity. Several prior art examples have demonstrated that bead packing problems can be eliminated by providing a high surface area-to-volume ratio in a μSPE chamber through the etching of pillars in the chamber during fabrication (Cady, N. C.; Stelick, S.; Batt, C. A. *Biosens. Bioelectron.* 2003, 19, 59-66; Christel, L. A.; Petersen, K.; McMillan, W.; Northrup, M. A. *J. Biomed. Eng.* 1999, 121, 22-27). While this increases the surface area for DNA binding and provides a regular array for reproducible chromatography, complex fabrication requirements and cost make these microdevices less attractive. Moreover, a large volume of elution buffer (greater than 50 μL) is required to elute the bound DNA from the columns of these microdevices, creating potential difficulties with downstream processing (e.g., PCR).

The fabrication of silica- and organic polymer-based rigid, porous monolithic columns has been reported as an alternative to using silica beads in HPLC and SPE applications and has provided new possibilities for the fabrication of μSPE columns in microdevices. Such monolithic columns are fabricated in situ by thermal- or photo-induced polymerization of a solution of monomer, initiator, and porogenic solvent. The resulting solid phase comprises pores in the nanometer to micron size range with a continuous interconnected network of channels. The advantages of in situ polymerization, including pore size control, high flow-rate and large mass-transfer, have allowed them to be successfully used in capillary electrochromatography and pre-concentration applications, e.g., chemical compounds, peptides and proteins.

Thermally-induced polymerized monolithic columns have been demonstrated as a functional medium for DNA separations by HPLC on commercial flat-disk CIM® (BIA Separations) monolith columns. DNA purification and separation have also been performed on bacterial and yeast genomic DNA in these columns; however, these columns showed low extraction efficiencies and required a high salt and high pH buffer for DNA release, which has been found to interfere with downstream processing, e.g. PCR. Moreover, thermally-induced polymerization does not ensure the accurate placement of monolithic columns within the architecture of microdevices. By contrast, UV initiated photo-polymerized monolithic columns can be formed within specified spaces. As a result, both silica- and organic polymer-based photo-polymerized monolithic columns have been incorporated into microdevices (Morishima et al. *J. Anal. Chem.* 2001, 73, 5088-5096).

While silica-based monolithic columns have been found to be functional for binding and extracting DNA, the use of certain silica-based monomers as part of the initial polymerization mixture has been problematic. Tetraethylorthosilicate (TEOS)-based monolithic columns have been found not to yield extraction efficiencies comparable to columns created with silica beads, due mainly to the difficulty in controlling pore size within such silica-based sot gel columns which, in turn, inhibits fluid flow. Silica-based monolithic columns reported by Ferrance et al. *Anal. Chins. Acta* 2003, 500, 223-236, were produced using tetramethoxyorthosilicate (TMOS) monomers and a porogen to provide the appropriate pore size, but these columns could not easily be localized within microdevices.

None of the methods described above provides the important advantages of the fabrication method for a grafted UV photo-polymerized silica-based monolithic column. These advantages include increased column capacity and efficiency for DNA extraction resulting in significantly higher DNA yields from very low volume DNA samples of the type encountered in clinical and forensic applications; precise placement of the monolithic column in a capillary or other microdevice, such as a microfluidic microchip; minimal reagent volume required to elute DNA from the column; and the ability to use a low ionic strength buffer for the elution of DNA from the monolithic column, allowing for direct PCR analysis of the extracted DNA without further sample cleaning steps.

SUMMARY OF THE INVENTION

The present invention relates to the fabrication of a grafted, UV photo-polymerized silica-based monolithic column and the use of such column for the extraction of nucleic acid. In one embodiment, a method is provided for fabricating a silica-based monolithic column, wherein a vessel is filled with a polymerization mixture that is formed into monolithic solid phase for nucleic acid extraction through in situ photo-polymerization.

In another embodiment of the invention, a method is provided for fabricating a grafted, UV photo-polymerized silica-based monolithic column, said method comprising the steps of:
(a) providing a vessel;
(b) conditioning the interior surface of said vessel by contacting it with a silica-based flushing solution;
(c) preparing a silica-based monomer solution through hydrolysis of a silica monomer;
(d) forming a polymerizable mixture by admixing said silica-based monomer solution, an initiator material, and a porogenic solvent;
(e) introducing said polymerizable mixture into the capillary;
(f) initiating the in situ polymerization of said polymerizable mixture by exposing UV light exposure means to selected portions of the mixture, thereby forming a silica-based monolith column within portions of the capillary; and
(g) flushing a silica-based reagent through said silica-based monolith column, thereby forming the grafted porous silica-based monolith column within portions of the vessel.

In one embodiment of the invention, the vessel is a capillary. In yet another embodiment of the invention a method is provided for solid phase extraction of nucleic acid.

The silica-based monolithic column described in the present invention possesses enhanced capacity and efficiency for extraction, allowing for an increase in the yield of nucleic acid extracted from very low volume samples. Additionally, the silica-based monolithic column described in the present invention allows for nucleic acid to be eluted from the column using a minimal volume of a low ionic strength buffer, which further allows direct PCR analysis of the extracted nucleic acid without further sample cleaning steps, unlike the elution buffers used with commercial monolithic affinity columns which typically have a high salt concentration and/or high pH. Furthermore, the silica-based monolithic column described in the present invention allows for precise placement of the monolithic column in a capillary or other microdevice, such as a microfluidic microchip.

BRIEF DESCRIPTION OF THE DRAWINGS

FIG. 6 are graphs showing the effect of TMOS A) concentration and B) derivatization time on extraction capacity (n≥3). Column conditions: 10% TMSPM derivatized with: A) various concentration of TMOS for 30 min and B) 85% TMOS for various lengths of time; length: 12 cm; running pressure: 12 psi.

FIG. 7 are graphs showing the effect of TMSPM concentration on extraction capacity (n=3), with elution profiles produced using A) LIF and B) UV detection. Column conditions: derivatization with 85% TMOS for 45 min; length: 12 cm. 23 Wen et al.—DNA Extraction Using a Novel Tetramethylorthosilicate-Grafted Photo-Polymerized Monolithic Solid Phase

DETAILED DESCRIPTION OF PREFERRED EMBODIMENTS

In describing and claiming the invention, the following terminology will be used in accordance with the definitions set forth below:

As used herein, the term "purify" and like terms relate to an enrichment of a molecule or compound relative to other components normally associated with the molecule or compound in a native environment. The term "purify" does not necessarily indicate that complete purity of the particular molecule will be achieved during the process. A "highly purified" compound as used herein refers to a compound that is greater than 90% pure.

As used herein a "chaotropic agent" is an agent that is capable of disrupting the hydrogen bonding between water and nucleic acid and includes but is not limited to urea, guanidine hydrochloride, and potassium iodine.

As used herein, the term "derivatization" and like terms refer to the process of bonding the molecules of a suitable silica-based monomer reagent to the surface of a silica-based monolithic column. The term "grafted" refers to the state of the silica-based monolithic column after derivatization.

As used herein, the term "immobilization" and like terms refer to the attachment or entrapment, either chemically or otherwise, of material to another entity (e.g., a solid support) in a manner that restricts the movement of the material.

As used herein a "microcolumn" is a matrix comprising pores of a preferred size of about 0.1-15 μm in diameter, more preferably about 1-10 μm, most preferably about 4-6 μm. The microcolumn preferably has an average cross sectional dimension of about 1 mm$^2$ to about 100 μm$^2$, more preferably about 0.5 mm$^2$ to about 7,000 μm$^2$, and most preferably 0.275 mm$^2$ to about 30,000 μm$^2$.

As used herein a "microchannel" is a passageway (in any form, including a closed channel, a capillary, a trench, groove or the like) formed on or in a microfluidic substrate (a chip, bed, wafer, laminate, or the like) having at least one region with a cross sectional dimension of about 5 mm$^2$ to about 100 μm$^2$, preferably about 0.5 mm$^2$ to about 7,000 μm$^2$, and more preferably 0.275 mm$^2$ to about 30,000 μm$^2$.

A "microfluidic device" is an apparatus or component of an apparatus that includes at least one microchannel.

As used herein, the term "sol-gel" refers to preparations composed of porous metal oxide glass structures. The phrase "monolithic column" and like phrases refer to a solid bonded network of silica prepared by a hydrolysis—condensation polymerization reaction of suitable monomers. The materials used to produce the monolithic column can include, but are not limited to, aluminates, aluminosilicates, titanates, ormosils (organically modified slimes), and other metal oxides. As used herein a "vessel" is a passageway in any form (including a closed channel, a capillary, pipette, tube, a trench, groove or the like) having at least one region with a cross sectional dimension selected from a range of about 20-500 μm, preferably 50-300 μm, and more preferably about 100-250 μm.

The present invention is directed to a method of fabricating a grafted, UV photo-polymerized silica-based monolithic column and the use of such column for the extraction of DNA and other biologically-active molecules. The method of the present invention allows for precise placement of the monolithic column in a vessel, such as a capillary, pipette, tube, or microchannel on a microfludic device (e.g., a microfluidic chip), unlike columns fabricated in such devices through silica bead packing. Furthermore, the method described in the present invention allows for an enhancement of the ability to extract and purify DNA from very low volume samples, in particular, complex or crude biological samples like blood, using SPE. The method described in the present invention also allows for direct PCR analysis of DNA extracted from the column by eliminating the cleanup steps between extraction and further downstream processing through the use of minimal volumes of elution reagent.

In a preferred embodiment, the monolithic column is used to purify nucleic acid in a micro-total analysis system (μ-TAS). There are many formats, materials, and size scales for constructing μ-TAS. Common μTAS devices are disclosed in U.S. Pat. Nos. 6,692,700 to Handique et al.; 6,919,046 to O'Connor et al.; 6,551,841 to Wilding et al.; 6,630,353 to Parce et al.; 6,620,625 to Wolk et al.; and 6,517,234 to Kopf-Sill et al.; the disclosures of which are incorporated herein by reference. Typically, a μ-TAS device is made up of two or more substrates that are bonded together. Microscale components for processing fluids are disposed on a surface of, one or more of the substrates. These microscale components include, but are not limited to, reaction chambers, electrophoresis modules, microchannels, fluid reservoirs, detectors, valves, or mixers. When the substrates are bonded together, the microscale components are enclosed and sandwiched between the substrates. A major advantage of using a μ-TAS resides in the fact that the monolithic column can be used a part of an integrated system for analysis.

In accordance with one embodiment, the method of the present invention comprises a polymerized silica-based monolithic column. The use of silica-based monolithic columns for DNA extraction under chaotropic conditions has been demonstrated by both Wolfe et al. and Ferrance et al. The preparation of such columns has been previously described by others. A polymerized silica-based monolithic column is typically prepared by the room-temperature mixture and polymerization of suitable monomers (usually metal alkoxides), initiators, and porogens to form a porous, glassy material. In one embodiment, the silica-based monolithic column is prepared using a polymerization mixture comprised of a silica-based monomer solution, a photoinitiator, and a porogenic solvent. The column is typically prepared by introducing the polymerization mixture into a vessel such as a capillary, pipette, tube, or microchannel on a microfludic device.

From the foregoing, it will be seen that one aspect of the present invention is directed to the fabrication of a polymerized silica-based monolithic column in a capillary. More particularly, the capillary ranges in length from about 2 cm to 12 cm, has an inside diameter of 250 μm, and an outside diameter of 365 μm, with one end of the capillary serving as an inlet port and the opposing end serving as an outlet port. The polymerized silica-based monolithic column is contained within the capillary and spans a cross sectional dimension of the capillary so that fluid traversing from the inlet port to the outlet port must pass through the column. The column present in the capillary may extend the entire length of the capillary or may extend only a partial length of the capillary if localized within portions of the capillary during the polymerization process. Typically, the polymerization mixture is introduced into the capillary, and then polymerized so that the dimensions of the monolithic column match the original interior space of the capillary.

Still another embodiment of the present invention is directed towards modification of the surface of a polymerized silica-based monolithic column in a capillary. Breadmore et al. *Anal. Chem.* 2003, 75, 1880-1886, showed that silica beads modified with tetraethylorthosilicate (TEOS) provided a phase with excellent properties for DNA extraction. Modification of the surface of a polymerized silica-based monolithic column in a capillary typically involves pressure flushing a silica-based reagent through the capillary at room temperature for an indicated period of time. Molecules of the reagent condense on the surface of the monolithic column increasing the number of silica binding sites for nucleic acids.

Figure 1:
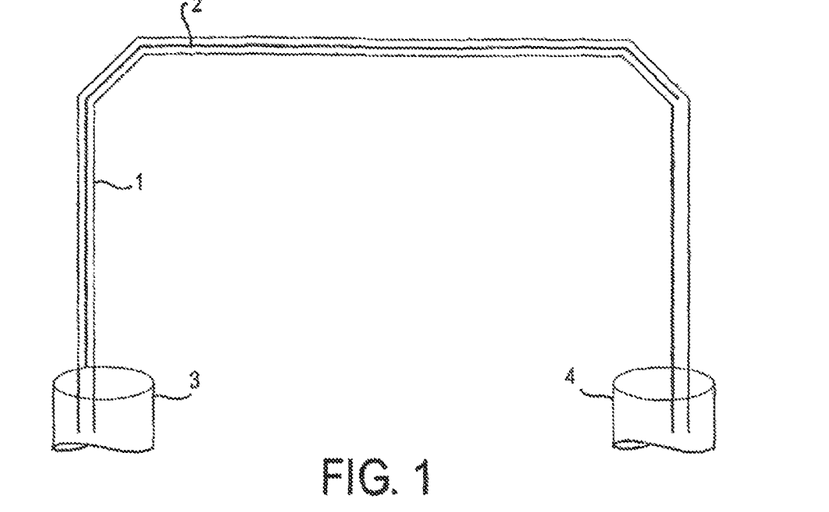
FIG. 1 is a drawing showing the side view of the experimental setup for nucleic acid extraction using a capillary containing a grafted, UV-photopolymerized silica-based monolithic column demonstrating the location of the inlet and outlet ports. sol-gel matrix.
Figure 2A:
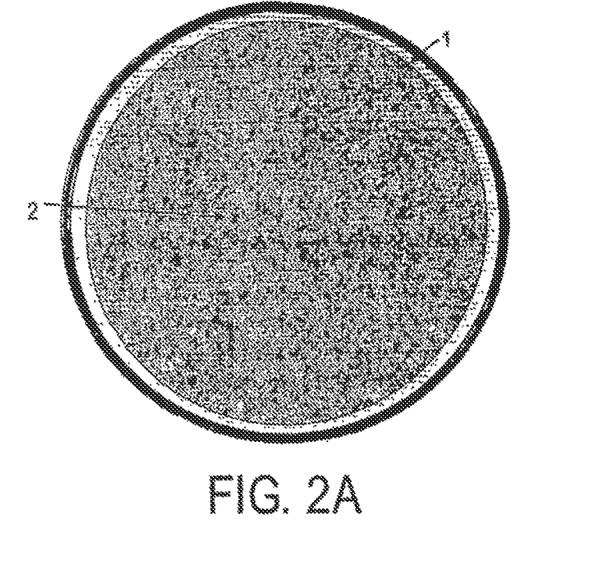
FIG. 2A shows a cross sectional view of a capillary device containing a grafted, UV-photopolymerized silica-based monolithic column.
Figure 2B:
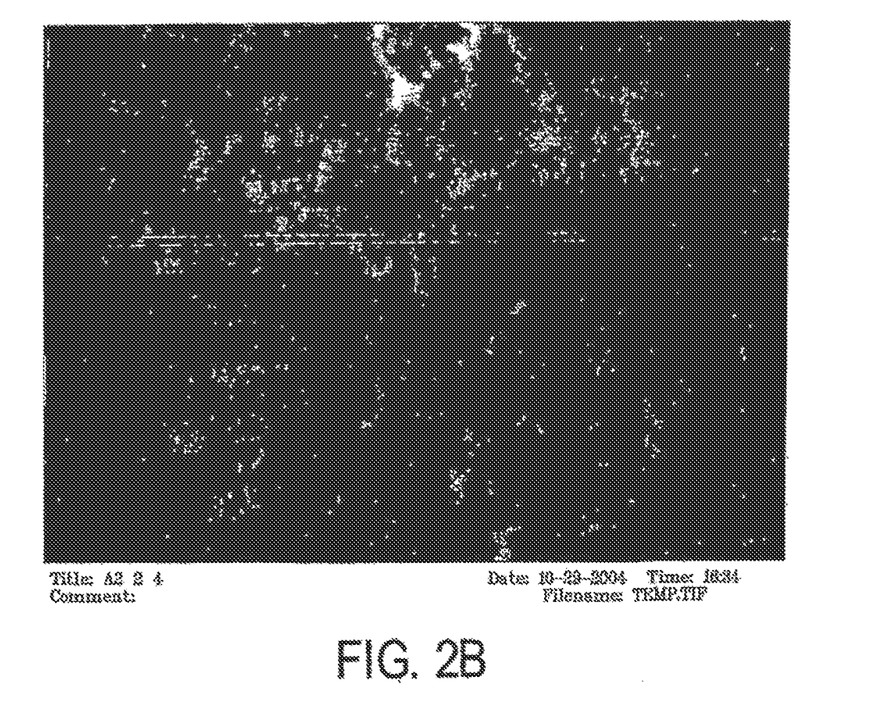
FIG. 2B is a scanning electron micrograph showing a cross sectional view of the actual internal micro-structure of the grafted, UV-photopolymerized silica-based monolithic column.

As shown in FIG. 1, one embodiment of the grafted, UV photo-polymerized silica-based monolithic column 1 of the present invention comprises a capillary 2. An inlet port 3 and outlet port 4 are in fluid communication with the capillary 2. A cross sectional view of the capillary 2 is depicted in FIG. 2. FIG. 2 demonstrates that the capillary 2 is filled with the silica matrix comprising the monolithic column 1. The silica matrix spans a cross sectional dimension of the capillary, so that a fluid traversing from the inlet port 3 to the outlet port 4 must pass through the monolithic column 1. FIG. 2A shows a scanning electron micrograph of the actual monolithic column 1 internal micro-structure.

To prepare the grafted, UV photo-polymerized silica-based monolithic column of the present invention, a silica-based monomer solution is prepared by hydrolyzing a suitable silica-based monomer in an acidic aqueous solution (for example 0.1 M HCl) in accordance with procedures known to those skilled in the art. In one embodiment, the silica-based monomer solution is prepared through the hydrolysis of 3-(Trimethoxysilyl)propyl methacrylate (TMSPM) in an acidic aqueous solution (for example 0.1 HCl) for five minutes to form the silica-based monomer solution. TMSPM is capable of producing a sol-gel monolithic column, but relies upon its acrylate functional groups for formation of the final monolithic column by forming a polyacrylate organic matrix around a silica backbone upon polymerization. TMSPM simultaneously provides the ability to localize the monolithic column within a microdevice, unlike sol-gel monolithic columns fabricated using tetramethoxyorthosilicate (TMOS) monomers or through bead packing. The silica based monomers appropriate for the present invention include any alkoxy silane compounds of type $R_nSi(OR')_{4n}$ as described by C. J. Brinker et al. in Sol-Gel Science, Academic Press, Inc., New York, N.Y., 1990, which is incorporated herein by reference. The most commonly used of these compounds are tetraethylorthosilicate (TEOS), tetramethoxyorthosilicate (TMOS), and poly(ethoxydisiloxane) (PEDS). Other copolymers may also be used including, but not limited to, 3-(trimethoxysilyl)propyl methacrylate (TMSPM), 3-[tris(trimethylsiloxy)silyl] propyl methacrylate, 3-(diethoxysilyl)propyl methacrylate, 3-(dimethylchlorosilyl)propyl methacrylate, 3-(trichlorosilyl)propyl methacrylate, and combinations thereof.

A polymerization mixture is then formed by admixing the silica-based monomer solution with a photoinitiator and a porogenic solvent, in accordance with procedures known to those skilled in the art. In one embodiment, the silica-based monomer solution is comprised of TMSPM and is present in the polymerization mixture in a concentration of 17%. The photoinitiator, can be, but not limited to, benzophenone, dimethoxyacetophenone, xanthone, thioxanthone, and mixtures thereof with a commercially available mixture.

The porogenic solvent functions to foster the development of a suitable pore structure in the monolithic column during the polymerization process. The porogenic solvent can be, but is not limited to, water, organic solvents, and mixtures thereof. Organic porogenic solvents can be, but not limited to, hydrocarbons, alcohols, ketones, aldehydes, organic acid esters, soluble polymer solutions, and mixtures thereof. In a preferred embodiment, the solution is comprised of toluene, as the preferred porogenic solvent, in a concentration of about 90%.

The polymerization mixture is then introduced into the capillary. In one embodiment, the capillary is conditioned prior to addition of the polymerization mixture. Conditioning of the capillary comprises the steps of rinsing the interior surface of the capillary with a basic solution (for example, 1 M NaOH), water, an acidic solution (for example, 0.1 M HCl), and an alcohol solution; flushing the interior surface of the capillary with a silica-based flushing solution; and allowing the capillary to dry. In a preferred embodiment, the silica-based flushing solution is comprised of TMSPM in a concentration of about 30%.

In situ polymerization of the polymerization mixture within the capillary is then initiated to form a polymerized monolithic column within the capillary. In one embodiment, polymerization is initiated by exposing the polymerization mixture within the capillary to a UV light source, such as, for example, a Model RSM100W 100 W broad UV wavelength lamp. In a further embodiment, the length of the monolithic column formed in the capillary through polymerization is controlled by selective exposure of sections of the polymerization mixture within the capillary to UV light. To achieve selective exposure, a portion of the polyimide coating on the capillary is removed in the area of the desired monolith and other portions of the capillary are covered with a black cloth during UV exposure to prevent polymerization at these particular locations in the capillary.

Once the photo-polymerized silica-based monolithic column has been formed in the capillary, the silica monomer may be grafted onto the surface of the monolithic column by flushing the column with a silica-based monomer reagent. In a preferred embodiment, the silica-based monomer reagent is comprised of tetramethylorthosilicate (TMOS), which has enhanced hydrolysis properties under acid-catalyzed conditions and bonds to the surface of the monolithic column at a faster rate, thereby reducing the total fabrication time for the monolithic column. In a further embodiment, TMOS is preferably present in the silica-based monomer reagent in a concentration of about 85%. The reagent is vortexed at room temperature for one minute and then pressure flushed through the column at room temperature. In a further embodiment, the reagent is flushed through the column for 45 minutes. The hydrolyzed TMOS molecules are the bound to the column. In yet another embodiment, TMOS is bound to the column through condensation with unreacted siloxane/silanol groups that are present on the surface of a photo-polymerized monolithic column prepared using TMSPM, allowing the formation of a continuous network of silicon dioxide and increasing the number of silica binding sites on the surface of the column as a result.

The resulting grafted, UV photo-polymerized silica-based monolithic column possesses enhanced capacity and efficiency for extraction of nucleic acids. In accordance with one embodiment, a method of extracting nucleic acids from a biological sample comprises a first step of contacting the biological sample with a chaotropic agent which lyses cellular membranes and releases the cellular nucleic acid sequences. In one embodiment, the chaotropic agent comprises 6M guanidine hydrochloride prepared in TE buffer (10 mM Tris, 1 mM EDTA, pH 8.0). After mixing the biological sample with the chaotropic agent, the sample is directly loaded onto the column of the present invention, these conditions being conducive for nucleic acid binding to the column. In accordance with one embodiment, the length of the column of the present invention is decreased from 12 cm to 2 cm. By reducing the length of the monolithic column, the back pressure is reduced allowing higher flow rates through the column. The column is then washed with a suitable solvent, such as an aqueous/organic (alcohol, acetonitrile) mixture (40-80% organic), to remove unbounded material and the bound nucleic acid sequences are then released from the column by washing the column with an appropriate buffer known to those skilled in the art, such as phosphate buffer, citrate buffer, Tris buffer or Chaps buffer, with an ionic concentration of less than 150 mM. In one a preferred embodiment, the nucleic acid is released from the column by washing with a buffer that is compatible with PCR reactions, such as TE buffer.

Binding of nucleic acids to this matrix utilizes the same mechanism as all silica based phases for nucleic acid extraction, with the presence of the chaotropic salt causing the nucleic acids to adsorb on the silica surface over a broad chaotropic concentration, pH range, and temperature will vary with the phase utilized.

Release from the surface occurs into a low ionic strength aqueous buffer following removal of the chaotropic agent.

Preferably, the temperature at which the binding and release steps are performed is no greater than about 95° C., more preferably no greater than about 70° C., 65° C., 60° C., 55° C., 50° C., 45° C., or 40° C. Most preferably, the same temperatures apply to the entire process for both the binding and release steps. The release step, or the entire process, may even be performed at lower temperatures, such as 35° C., 30° C., or 25° C. Most preferably, the entire process occurs at room temperature.

Furthermore, the elution step preferably occurs under conditions of low ionic strength, suitably less than about 500 mM, preferably less than about 400 mM, 300 mM, 200 mM, 100 mM, 75 mM, 50 mM, 40 mM, 30 mM, 25 mM, 20 mM, or 15 mM, most preferable less than about 10 mM. The ionic strength may be at least about 5 mM, more preferably at least about 10 mM. These ionic strengths are also preferred for the binding step.

The use of such mild conditions for the elution of nucleic acid is especially useful for extracting small quantities of nucleic acid, as the extracted DNA or RNA can be transferred directly to a reaction or storage tube without further treatment steps. Therefore loss of nucleic acid through changing the container, imperfect recovery during further treatments, degradation, denaturation, or dilution of small amounts of nucleic acid can be avoided. This is particularly advantageous when a nucleic acid of interest is present in a sample (or is expected to be present) at a low copy number, such as in certain detection and/or amplification methods.

Without further description, it is believed that one of ordinary skill in the art can, using the preceding description and the following illustrative examples, make and utilize the compounds of the present invention and practice the claimed methods. The following example is given to illustrate the present invention. It should be understood that the invention is not to be limited to the specific conditions or details described in this example.

EXAMPLE

Preparation of Grafted, UV-Photopolymerized Silica-Based Monolithic Column For Use in Solid Phase Extraction Materials and Reagents. Fused-silica capillary (250 μm i.d.×365 μm o.d.) was purchased from Supelco, Inc. (Bellefonte, Pa.). 3-(Trimethoxysilyl)propyl methacrylate (TMSPM, minimum 98%) and tetramethylorthosilicate (TMOS, 98%) were obtained from Sigma-Aldrich (Milwaukee, Wis.). Toluene (99.9%), 2-propanol (HPLC grade), guanidine hydrochloride (GuHCl, electrophoresis grade), ethanol (95%) and Tris(hydroxymethyl)aminomethane (Tris) were purchased from Fisher Scientific (Fairlawn, N.J.). EDTA was obtained from American Research Products (Solon, Ohio). Photoinitiator Irgacure 1800 was generously, donated by Ciba (Tarrytown, N.Y.). All solutions were prepared with nanopure water (Barnstead/Thermolyne, Dubuque, Iowa).

Labeled DNA Fragment Generation. A 380-bp β-globin DNA fragment was amplified using the polymerase chain reaction (PCR) in a Bio-Rad Mycycle™ Thermal cycler (Hercules, Calif.) using forward primer tagged with the fluorescence dye 5-FAM ($\lambda_{ex}$ 4488 nm, $\lambda_{em}$ 520 nm) (MWG Biotech, High Point, N.C.). Thermocycling conditions were as follows: 94° C. for 30 sec, 60° C. for 30 sec and 72° C. for 30 sec (30 cycles) with a 3 min preincubation at 95° C. and a final extension of 1 min at 72° C. The purity of the PCR product was assessed by capillary electrophoresis (Beckman P/ACE MDQ, Fullerton, Calif.) using LIF detection. The fluorescently-tagged PCR product was used in preliminary solid phase extraction experiments to allow sensitive on-line detection of the profiles achieved using a capillary electrophoresis instrument equipped with LIF detection.

Preparation of Photo-Polymerized Monolith. The internal wall surface of a 250 μm i.d. fused silica capillary was first treated with 3-(trimethoxysilyl)propyl methacrylate (TMSPM). Briefly, the capillary was rinsed with 1 M NaOH for 15 min, water for 15 min, 0.1 M HCl for 15 min, and finally 95% ethanol for 5 min at 0.1 mL/min. A 30% (v/v) TMSPM solution (in 95% ethanol), adjusted to pH 4 with acetic acid, was flushed through the capillary at 3 μL/min for 60 min using a syringe pump (KD Scientific, Holliston, Mass.) and subsequently dried under a stream of nitrogen overnight. The treated capillary was left at room temperature for at least one day before use.

The monomer solution was prepared as previously reported by Dulay et al., *Anal. Chem*, 2003, 73, 3921-3926. A monomer solution consisting of 85% (v/v) TMSPM and 15% (v/v) 0.1 M HCl was stirred at room temperature in the dark for 20 min. The sol-gel solution was prepared with 10% (v/v) monomer solution, 90% (v/v) toluene and 5% (w/v) photoinitiator Irgacure 1800 and stirred in the dark at room temperature for 5 min. The treated capillary was then filled with the sol-gel solution and exposed to UV light using a 100 W broad UV wavelength lamp (Model RSM100 W, Regent Lighting Corp. Burlington, N.C.) for 5 min to initiate polymerization. The monolith length was controlled by removing a portion of the capillary polyimide coating. The detection window fabricated on the capillary by removal of the polyimide coating was covered with a black cloth during UV exposure to prevent polymerization at this particular location. After polymerization, the capillary was installed into the capillary electrophoresis instrument cartridge and ethanol was flushed through the column to visualize the monolith and remove excess monomer reagent. The minimum pressure required to flow solution through the monolith is referred to as the back pressure through the column in the following sections.

TMOS Derivatization of Monolith. Once the monolith was formed, the surface was modified by treatment with various concentrations of TMOS. For example, an 15.85% TMOS solution was prepared with 85% (v/v) TMOS and 15% (v/v) 0.1 M HCl. The TMOS:HCl ratio was varied accordingly for different TMOS concentrations. The solution was vortexed at room temperature for 1 min. The monomer solution was then pressure-flushed through the monolithic capillary (12 psi) at room temperature for the indicated period of time.

Solid Phase Extraction Procedure. PCR-amplified 380-bp human genomic β-globin fragment products were diluted 5-fold in 7.5 M guanidine hydrochloride prepared in TE buffer (10 mM Tris, 1 mM EDTA, pH 8.0). Human genomic DNA, purified from human blood (60 μg/mL, A260/A280 ratio=1.795), was diluted 20-fold in 6 M guanidine hydrochloride buffer (pH 6). It is noteworthy that the samples were diluted in guanidine hydrochloride solutions of different starting concentrations due to the difference in dilution factors, to achieve a final guanidine concentration of 5.7M.

Before extraction, the SPE column was equilibrated with 6 M guanidine hydrochloride prepared in TE buffer for 10 min. Both sample and equilibration solutions were adjusted to pH 6 using 0.1 M HCl. DNA samples were loaded onto the column using pressure injections for various injection times. A wash step was subsequently performed using 80% (v/v) 2-propanol in water to remove unbound DNA and proteins/contaminants then the DNA was eluted with TE buffer. Blank experiments were performed for each column formulation investigated, by replacing the DNA sample volume with water. All extraction experiments were performed at room temperature.

To compare the DNA binding data obtained from the various monolith formulations investigated, the columns were systematically overloaded until reaching constant DNA elution peak areas. Excess DNA (not bound to the monolith), in the load and washing steps, and extracted DNA, in the elution step, were detected online and used to calculate the relative column capacity and extraction efficiency. For the purpose of this paper, the relative column capacity is defined as the maximum elution peak area obtained after overloading the monolithic column. The relative extraction efficiency is defined as the ratio of the elution peak area to the sum of load, wash and elution peak areas when the column was not overloaded.

DNA extraction of pre-purified human genomic DNA and whole blood samples. Extraction of pre-purified DNA and whole blood were performed using the TMSPM/TMOS monolith and the QIAamp® DNA mini kit (QIAGEN, Valencia, Calif.). In order to compare the efficiency of the two extraction methods, the same amount of DNA was loaded onto the columns. To do so, a syringe pump (KD Scientific, Holliston, Mass.) was used to deliver the DNA load solution at a constant flow rate (3 µL/min). Pre-purified human genomic DNA was obtained from blood (60 µg/mL, A260/A280 ratio=1.795) and 120 ng DNA were loaded onto the monolith and QIAGEN columns. Whole blood sample was chemically-treated prior to extraction to release DNA from the white blood cells. For the extractions performed on the monolith, 2.5 µL whole blood was incubated with 585 µL load buffer (6 M Gu-HCl, 10 mM Tris-HCl, 1 mM EDTA, pH 5.8) and 15 µL of a 10 µg/µL proteinase IC solution in a water bath at 56° C. for 10 min. 20 µL of the digested blood sample were loaded onto the monolith, corresponding to 83 nL whole blood and 4.9 ng DNA. For the extractions performed using the QIAGEN kit, whole blood was prepared according to the manufacturer's guidelines. Due to the low volume of whole blood loaded onto the QIAGEN column (83 nL), the blood sample was diluted in PBS buffer (2.5 µL blood in 600 µL PBS) prior to extraction. DNA was subsequently extracted from the monolith by washing away proteins and contaminants using 30 µL of a 80% (v/v) 2-propanol in water, and eluting DNA using 40 µL of TE buffer at a 3 µL/min flow rate. DNA extraction from the QIAGEN column was performed as suggested by the manufacturer. For both extractions, the amount of DNA present in the elution fractions was subsequently quantified.

DNA Quantification. Quantification was performed only for the extraction of purified human genomic DNA samples. Load, wash and elution fractions were collected, and the amount of DNA in each fraction was subsequently quantified using the PicoGreen® assay according to the manufacturer's guidelines.

Results and Discussion

DNA Extraction Using a TMSPM-based Monolith. In the presence of a chaotropic solution, nucleic acids bind avidly to a hydrophilic silica surface. This has been described previously (Tian, H.; Hühmer, A. F. R.; Landers, J. P. *Anal. Biochem.* 2000, 283, 175-191), and represents the chemical basis for the most common form of DNA purification via interaction with a solid phase surface (Boom, R. et. al. *J. J. Clin. Microbiol* 1990, 28, 496-503). While silica beads represent the most common form of silica used for this purpose, it is feasible to utilize other forms. This was shown by the reported use of silica sol-gel structures for DNA capture under chaotropic conditions by both Wolfe et al. (*Electrophoresis* 2002, 23, 727-733), and Ferrance et al. (*Anal. Chim. Acta* 2003, 500, 223-236). The silica sol-gel monoliths were found to be functional for binding and extracting DNA—however, Wolfe et al. found that the tetraethyl orthosilicate (TEOS)-based sol-gels did not yield extraction efficiencies comparable to silica beads, mainly because the sot-gel pore size was difficult to control, thereby inhibiting fluid flow through the matrix$_{13}$. The sol-gel reported by Ferrance et al. was produced using tetramethoxyorthosilicate (TMOS) monomers and a porogen to provide the appropriate pore size, but these could not easily be localized within the microdevices. 3-(Trimethoxysilyl) propyl methacrylate (TMSPM) is a silica monomer containing an acrylate group, which can also produce a sol-gel monolithic structure, but it relies on the acrylate functional groups for formation of the final monolith. Upon polymerization, this monomer forms a polyacrylate organic matrix around a silica backbone, while providing the ability to localize the monolith through UV initiated polymerization. The stability of this monolith, the ability of the silica surface to bind DNA, and the tunable flow characteristics of these gels were first investigated to determine whether they could function as a suitable stationary phase for DNA extraction in microdevices.

Figure 3:
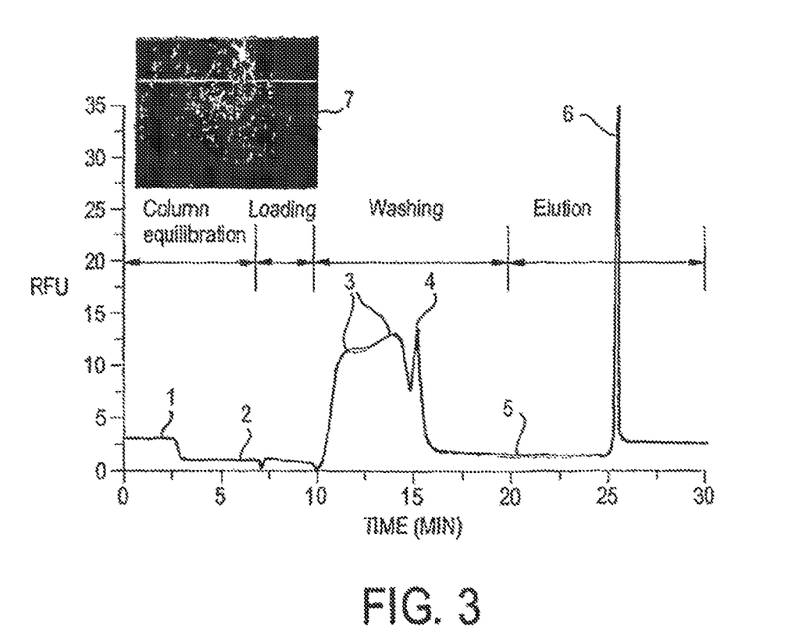
FIG. 3 is a graph showing typical DNA extraction profile of a 380 bp fragment of the β-globin gene in human genomic DNA produced using a 10% TMSPM monolith. Legend: 1. TE buffer baseline (from elution step). 2. Loading step baseline. 3. Excess single- and double-stranded DNA (resulting from column overloading). 4. System peak (resulting from guanidine-isopropanol interaction). 5. Washing step baseline (isopropanol). 6. Mixture of single- and double-stranded DNA in elution peak. 7. Scanning electron micrograph of the 10% TMSPM monolith internal micro-structure.

Initial investigations were performed using a 12 cm long monolithic column fabricated in a fused silica capillary. A fluorescently-labeled PCR-amplified DNA fragment was used in these preliminary experiments. While we understand that a single fragment of low molecular weight cannot be viewed as representative of the heterogeneous character of human genomic DNA, it functions as a simple model to assess the potential of the monolith for DNA extraction. In addition, we utilized capillary electrophoresis (CE) instrumentation equipped with LIP detection as the platform to evaluate the chromatography (DNA load, wash and elution steps) involved in the DNA extraction. The reasons for this are 1) it provides an excellent platform for control of small-volume samples and reagents; and 2) it has a sensitive, built-in LIP detection system. A typical extraction profile obtained from the CE using the 380 bp fragment of the β-globin gene amplified from human genomic DNA as the sample is presented in FIG. 3. The baseline shifts observed in this profile (numbered 1, 2 and 5) are due to the different buffers used in load, wash and elution steps having different optical properties. The system peak (number 4), also present in blank profiles (data not shown), is assumed to result from the interaction between guanidine and isopropanol occurring when load and wash buffers come in contact. The extraction of a PCR primer sample showed that single-stranded DNA (ssDNA) could also be extracted using the TMSPM monolith (data not shown). Both double-stranded DNA (dsDNA) and ssDNA were therefore assumed to be present in the excess DNA eluted during the wash step (peak number 3) and in the DNA detected during the elution step (peak number 6). In the following experiments, only the elution portion of the extraction profile will be displayed as the efficiency of the monoliths will mainly be evaluated by their relative column capacity (obtained from the elution peak area).

The effect of the TMSPM monomer concentration on the stability and back pressure was examined over a concentration range of 7% to 21%. Low TMSPM concentrations (<10%) led to the formation of monoliths with poor structural stability. Increasing the monomer concentration led to the formation of small pores and resulting in a back pressure that increased almost linearly with increasing monomer concentration (5 psi for 7% TMSPM; 16 psi for 17% TMSPM). At TMSPM concentrations greater than 19%, the back pressure was too high to effectively pump solution through the monolithic column using the capillary electrophoresis instrument internal pressure module (in accordance with previously reported data$_{42}$). Although the extraction efficiency improved with increasing monomer concentration as a direct result of the smaller pores and higher surface area available for DNA binding (data not shown), the increased back pressure ultimately led to slower flow rate and longer analysis time. A monomer concentration of 10% (back pressure of 7 psi) allowed for relatively high flow rates (up to 700 µL/hour) and was selected to evaluate the extraction efficiency of the monolithic column.

Figure 4:
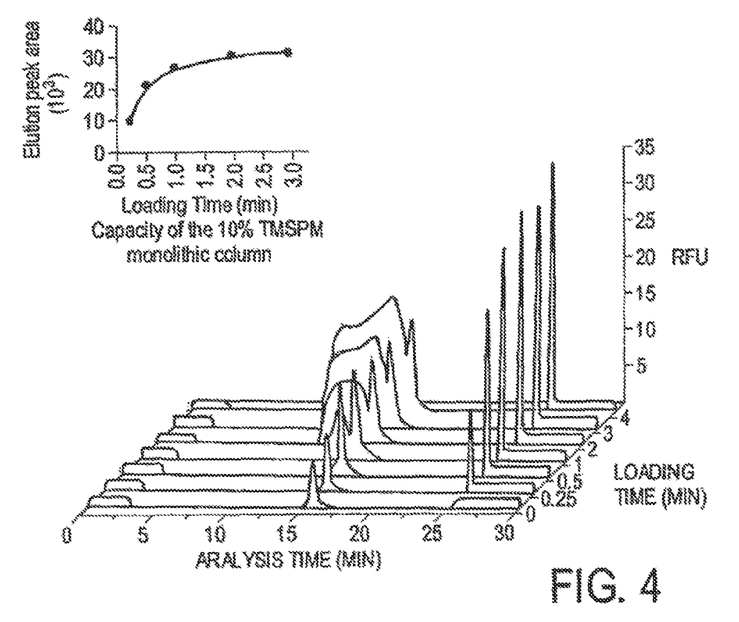
FIG. 4 is a graph showing the effect of sample loading time on DNA elution profiles, using a 10% TMSPM monolithic column. Column conditions: length: 12 cm; back pressure: 7 psi; running pressure: 11 psi. The inserted graph shows elution peak area versus sample loading time, displaying a stable elution peak area after reaching the column capacity.

Sample containing different masses of DNA (380 bp β-globin fragment) were loaded onto the column using a constant pressure (11 psi) but varying the injection time (FIG. 4). The longer loading time and subsequent increase in the mass of DNA loaded onto the column, resulted in an increase in the elution peak area, which reached a maximum at approximately 2 min (indicated on the inserted graph by the plateau formed from 2 min onwards). The large amount of unbound DNA that exits the column during the wash step and the relatively small elution peak suggested that DNA had a weak affinity for the TMSPM-based monolith. One possible explanation for this observation is that a substantial portion of silica binding sites are buried within the highly cross-linked organic polymer matrix and inaccessible to the DNA. It was clear that the column capacity had to be enhanced by modifying the monolith support.

Modification of the TMSPM Monolith with TMOS. Breadmore et al. (*Anal. Chem*, 2003, 75, 1880-1886) showed that silica beads derivatized with tetraethyl orthosilicate (TEOS) provided a phase with excellent properties for DNA extraction. They utilized the TEOS to hold the silica beads in place, but did not elaborate on whether the silica surface of the beads, the TEOS derivatization, or both, provided the DNA extraction sites. For this work, it was hypothesized that the characteristics of the TMSPM monolith could be improved by derivatizing it with a silica-based reagent. While both tetramethyl orthosilicate (TMOS) and TEOS were candidates for the derivatization of the TMSPM monolith, TMOS was selected due to its enhanced hydrolysis properties under acid-catalyzed conditions 43. The size of the alkoxy groups present on the organosilane is, indeed, known to affect the hydrolysis rate, which is 10-times slower for TEOS than TMOS.

Figure 5:
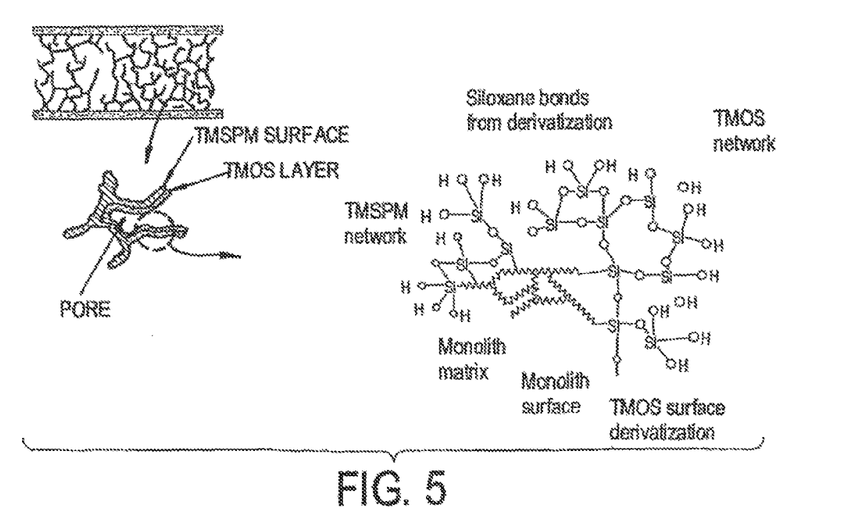
FIG. 5 is a schematic of TMOS derivatization on the TMSPM monolith surface.
Figure 6A:
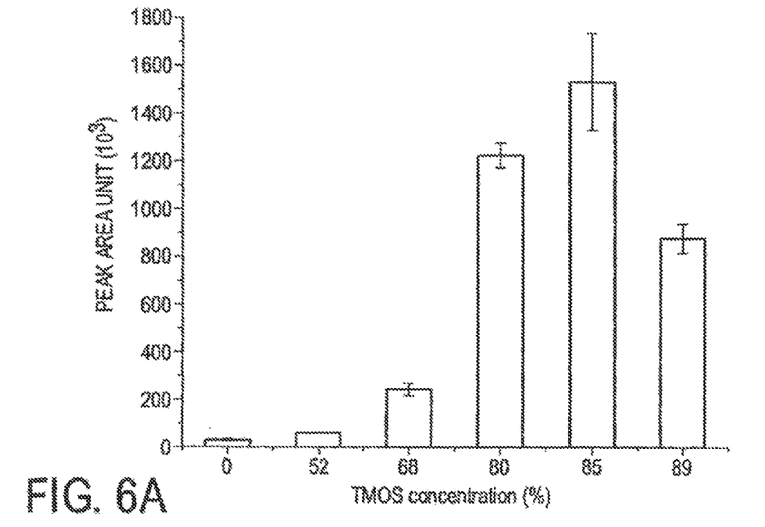

Upon acid hydrolysis, the hydrolyzed TMOS ($Si(OCH_3)_4$) molecules will condense with the unreacted siloxane/silanol groups present on the monolith surface, as displayed in FIG. 5. The reacting TMOS should form a continuous network of silicon dioxide which would increase the number of silica binding sites on the monolith surface. The TMOS hydrolysis rate is dependent on the water content in the monomer solution, and high $H_2O$:Si ratios are expected to favor TMOS hydrolysis. However, high water content will also inhibit siloxane bond formation during the condensation reaction, which will favor self-condensation of TMOS over TMOS-monolith condensation. Consequently, decreasing the water content is key to reducing TMOS hydrolysis and self-condensation rates, thereby increasing the reaction with the monolith. The effect of water content on the derivatization efficiency was investigated using $H_2O$:Si ratios in the monomer solution of: 1, 1.5, 2, 4 and 8, corresponding to TMOS concentrations of 89%, 85%, 80%, 68% and 52%, respectively; the acid catalyst concentration was varied to maintain a pH of 1.0. The derivatization time was initially set at 30 min to achieve comprehensive coverage of the monolith surface with TMOS. Results showed that the use of the TMOS sol-gel derivatization significantly increased the relative capacity of the monolith column for DNA extraction, particularly when concentrations in the 80%-89% range were employed (FIG. 6A). However, the higher the TMOS concentration the higher the pressure generated in the capillary. Microscopic examination of the monolith suggested that this may be due to the reaction proceeding rapidly at the high concentrations, since only part of the monolith appeared to be derivatized with TMOS (visually identifiable by a change in color). Depending on the TMOS concentration used, the color change was typically observed in the first 2-7 cm of the monolith. The higher concentrations gave a shorter derivatized region, but one that presumably had greater surface coverage and smaller pores, which led to an increased back pressure. Only about 2 cm of monolith was derivatized when 89% TMOS was used, which may explain the corresponding lower relative column capacity compared to that obtained using 85% TMOS, which covered 2.5-fold more of the monolith (~5 cm). From these observations and the data given in FIG. 6A, the largest column capacity was obtained using 85% TMOS, which was therefore selected for further optimization experiments.

Figure 6B:
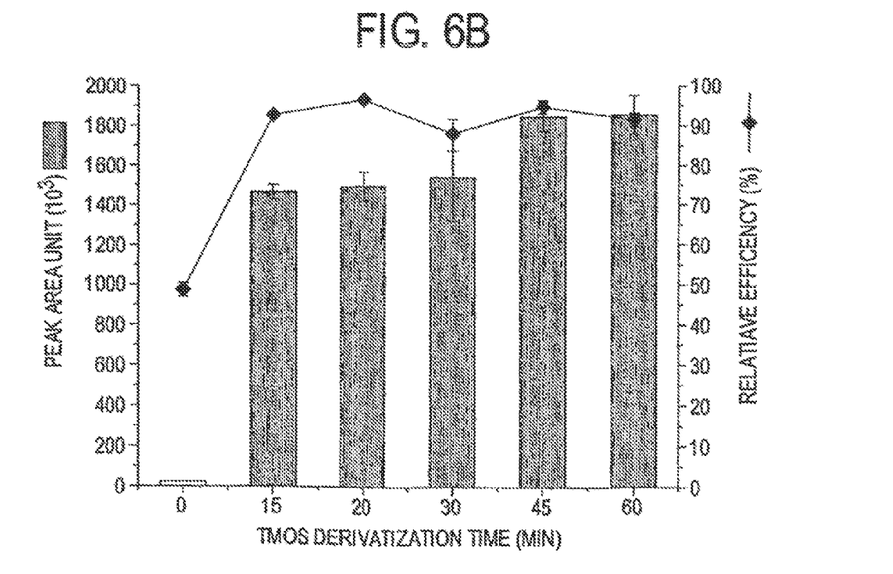

The time needed for effective TMOS derivatization of the sol-gel surface was also investigated over the time range of 0 to 60 min (FIG. 6B). Although even short derivatization times (15-30 min) were found to significantly improve the extraction efficiency compared to an underivatized column, the best capacity and extraction efficiency were produced with a 45 min derivatization time. It is noteworthy that derivatization times greater than 60 min led to capillaries that were completely occluded. TMOS derivatization was found to enhance the relative column capacity by about 60-fold (elution peak area=30,000±3,000 using the underivatized monolith versus 1,834,000±70,000 using the TMSPM/TMOS column) and the relative extraction efficiency by approximately 40% (48.5%±1.8% with the underivatized monolith versus 94.0%±1.3% with the TMSPM/TMOS column). The extraction reproducibility was also acceptable, with run-to-run relative standard deviation (RSD) using a single column below 12% and capillary-to-capillary RSD below 11%. As a result of these optimization experiments, the optimal relative column capacity and extraction efficiency was obtained using a monolith derivatized with 85% TMOS for 45 min at room temperature.

Figure 7A:
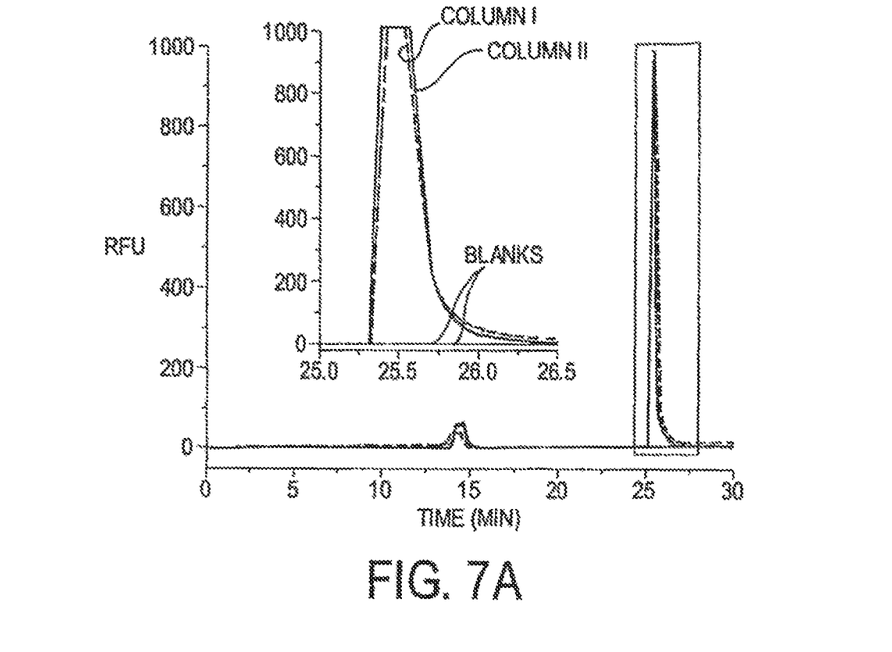

Effect of TMSPM Monomer Concentration on DNA Extraction. The monolith utilized in the derivatization optimization experiments was produced using the 10% TMSPM monomer concentration originally selected for further testing based on its stability (resistance to extrusion) with low back pressure. Once the derivatization studies had been performed, however, it was hypothesized that increasing the TMSPM monomer concentration could further improve column capacity and extraction efficiency because of the additional surface area and silica sites available for TMOS modification. Preliminary investigations had shown that the relative column capacity of the underivatized monolith formed from a 17% TMSPM (peak area=54,000±5,000) was nearly double the capacity of a 10% TMSPM column (peak area=31,000±2,000). This was not truly significant because of the low binding capacity of the underivatized monoliths, but this increased number of functional sites available could be more important in a derivatized structure. Despite the higher back pressure associated with 17% TMSPM, the derivatization experiment was repeated using this monolith. The DNA profiles obtained from 10% and 17% TMSPM-modified monoliths using LIF detection are shown in FIG. 7A. Comparison of these profiles is difficult because the signal produced from the DNA elution peaks exceeded the detector limit. The same elution profiles obtained using UV detection (FIG. 7B) showed the DNA elution peak area produced from the 17% TMSPM column to be larger than that from the 10% TMSPM column, confirming the effect of monomer concentration on the column capacity. It is noteworthy that the UV traces only provided semi-quantitative information as the sensitivity of the UV detection method was not fully assessed and the limit of detection of DNA by UV is unknown.

Figure 7B:
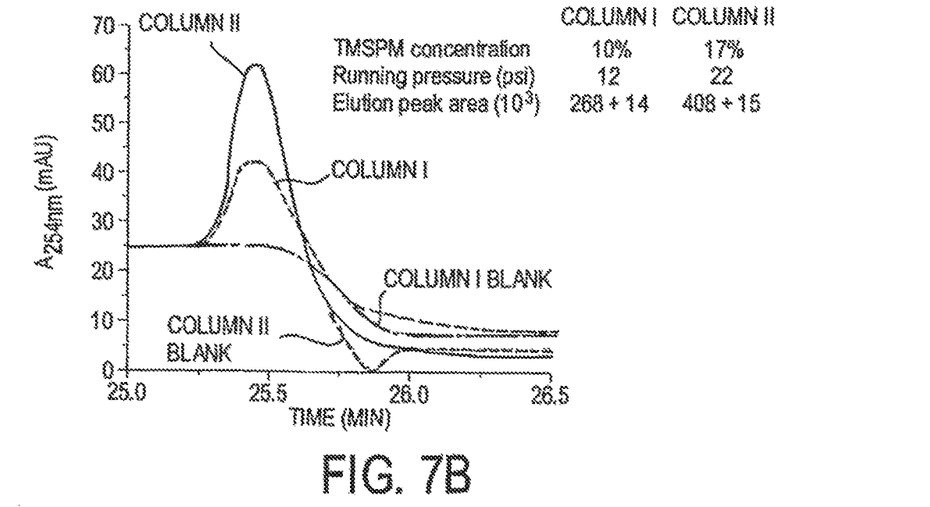

However, the difference in peak area observed between the 10% and 17% TMSPM monoliths is large enough to conclude that the 17% TMSPM column has a higher relative capacity than the 10% TMSPM monolith. In addition, the column was also found to be more robust when a higher TMSPM concentration was used. Where pressures greater than 18 psi were found to damage the 10% TMSPM sol-gel, the 17% TMSPM sol-gel was able to withstand pressures as high as 30 psi. This observation was important since the use of higher flow rates could potentially lead to shorter analysis times.

Figure 8:
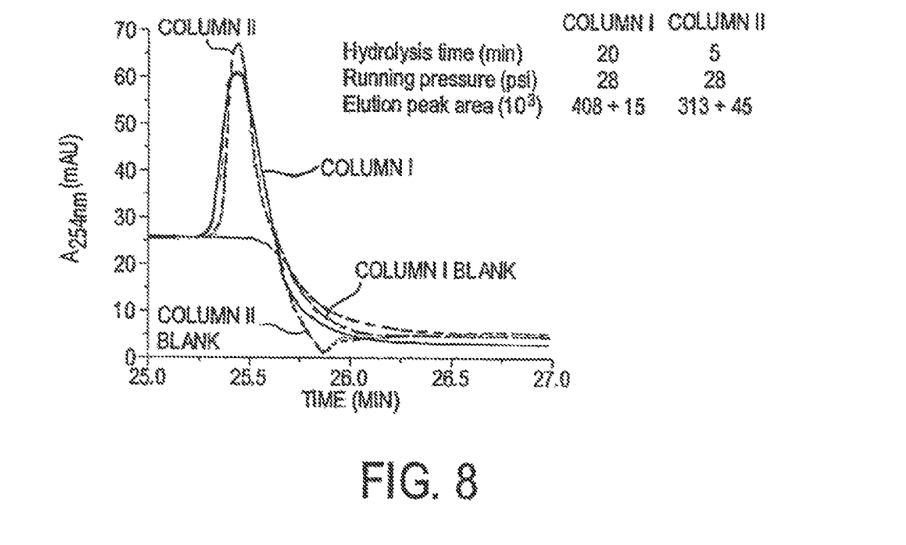
FIG. 8 is a graph showing the effect of TMSPM hydrolysis time on relative column capacity (n=3). Column conditions: 17% TMSPM derivatized with 85% TMOS for 45 min; length: 12 cm.

Effect of TMSPM Monomer Hydrolysis Time on DNA Extraction Capacity. It was hypothesized that decreasing the pre-photopolymerization TMSPM monomer hydrolysis time would allow for only partial hydrolysis, thereby decreasing siloxane bond formation and providing a larger number of unhydrolyzed alkoxide groups on the monolith surface available for TMOS derivatization. However, experimental data suggested that similar relative DNA binding capacities were achieved for full (20 min) and partial (5 min) monomer hydrolysis (FIG. 8). One possible explanation is that, although more alkoxide groups remain intact through the partial hydrolysis step, many of them could be buried inside the monolith after photo-polymerization and, therefore, inaccessible for TMOS derivatization. An alternative explanation is that even the 5 minute hydrolysis step fully hydrolyzes all of the alkoxide groups, but the decreased time for formation of the silane bonds between monomers results in a different sol-gel structure with an equivalent surface area of siloxane groups. It was observed that shorter hydrolysis time resulted in a decrease in the back pressure of the underivatized monolith (from 17 psi to 11 psi) for the same monomer concentration and column length—this suggested that larger pores had been formed in the shorter hydrolysis time monolith, which would allow for a higher flow rate to be applied. However, the back pressure was similar after TMOS derivatization (18 psi). It was also observed that TRIOS derivatization was not as reproducible on columns prepared from a 5 minute monomer hydrolysis compared to columns produced with a 20 minute monomer hydrolysis (important variation in the length of the derivatized portion). Columns produced from the long monomer hydrolysis also displayed a slightly higher binding capacity as shown by the larger amount of extracted DNA, and better reproducibility (RSD=3.7% compared to 14.4% obtained with the short hydrolysis column).

Figure 9:
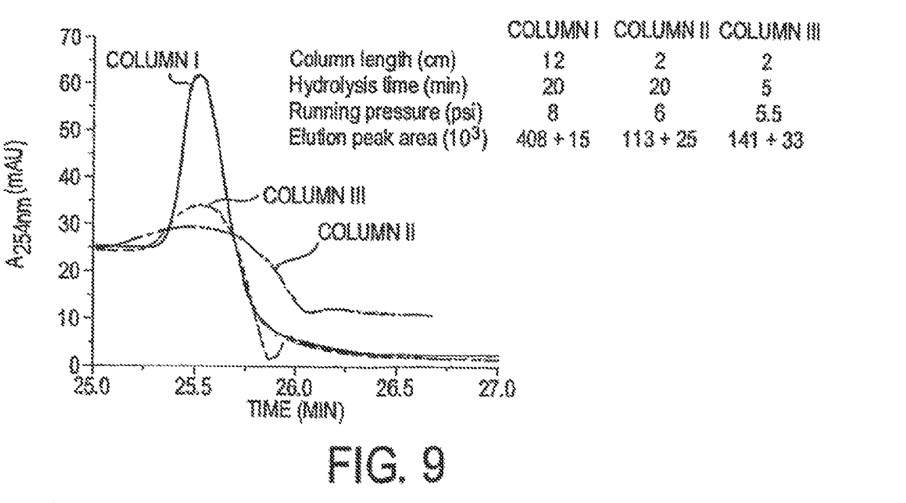
FIG. 9 is a graph showing the effect of column length on relative column capacity (n=3). Column conditions: 17% TMSPM derivatized with 85% TMOS for 45 min.
Figure 10:
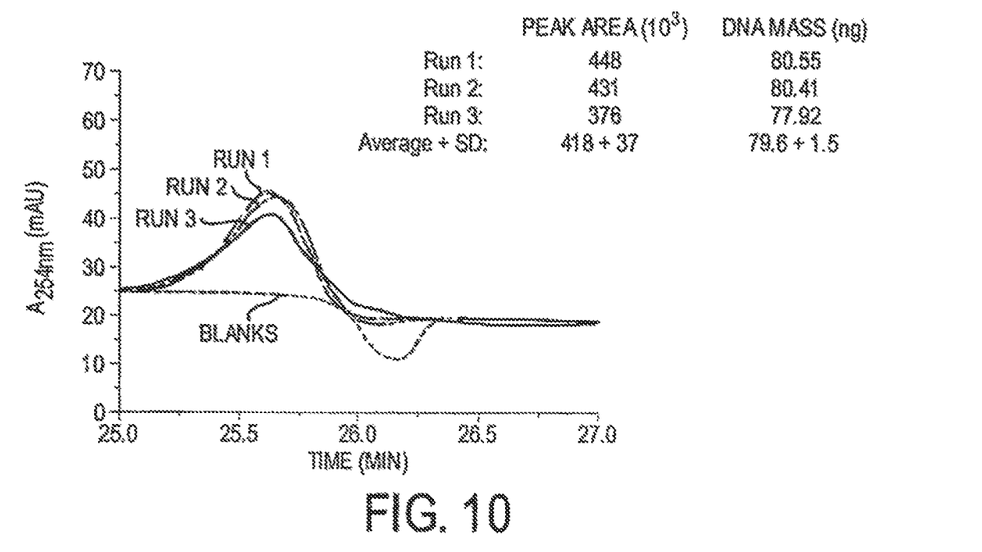
FIG. 10 is a graph showing the extraction of pro-purified human genomic DNA using a 2 cm TMSPM/TMOS monolith. Column conditions: 17% TMSPM derivatized with 35% TMOS for 45 min.

Decreasing the Monolithic Column Length. The ultimate goal of this work is to utilize these photopolymerizable sol-gels in microchips for selective placement of the DNA extraction matrix in specific regions of an integrated processing device. To evaluate the potential of the developed monolith for DNA extraction in a micro-scale format, the effect of decreasing the monolith column length was explored. Using the optimized monolith formulation and derivatization procedure determined above, the relative capacity obtained with a 12 cm monolithic column was compared to that obtained with a 2 cm monolith (FIG. 9). Although the reduction in monomer hydrolysis time from 20 to 5 minutes did not appear to improve the column binding capacity in previous experiments, larger pores were formed (as suggested by the decrease in back pressure) and the additional 'space' created within the monolith structure should allow for a larger number of TMOS molecules to react with each other and form a denser TMOS layer with a higher surface area available for DNA binding. Both 5 and 20 min TMSPM hydrolysis times were, therefore, investigated again on a 2 cm column to optimize DNA binding capacity on the shorter monolith. FIG. 9 showed that although the length of the short monolith is 17% of the 12 cm column, the DNA recovered is approximately 30% of the DNA eluted from the long monolith. These results imply that the 12 cm column was not fully derivatized with TMOS, which is consistent with the microscopic examination of the capillary revealing that only part of the monolith appeared to be derivatized. It was also observed that decreasing the length of the column led to a significant decrease in back pressure (from 18 psi on the 12 cm monolith to 2.5 psi on the 2 cm with 20 min TMSPM hydrolysis time and 2 psi with 5 min hydrolysis time, enabling higher flow rates to be applied. Additionally, a slightly higher binding capacity was obtained from the 2 cm column produced with a 5 minute monomer hydrolysis compared to a 20 minute hydrolysis, suggesting that TMOS derivatization was indeed better when applied onto larger pores. In order to further evaluate the potential of the column for clinical applications, a purified human genomic DNA sample was extracted using the optimized monolith on a 2 cm column (FIG. 10). Quantification of the elution fractions by Picogreen® showed that 79.6±1.5 ng human genomic DNA had been extracted, with a relative extraction efficiency of 85.7±2.2%. These data suggest the relatively column capacity to be high, and confirm the potential of the optimized monolith for DNA extraction in microdevices.

Evaluation of Column Efficiency Compared to Commercial SPE Methods. In order to assess the performance of the monolith, extractions of pre-purified human genomic DNA and whole blood samples were performed using the capillary-based monolith and the QIAGEN spin column. The same mass of DNA was loaded onto both columns to compare the efficiency of the two extraction methods. Results, displayed in Table 1, demonstrated that the monolithic system had an extraction efficiency superior to the QIAGEN spin column for the extraction of pre-purified human genomic DNA, with extraction efficiency as high as 86% compared to 49% obtained with the QIAGEN column. This was repeated with whole blood as the sample to assess the potential of this monolith for clinical and forensic applications. A small volume of blood (equivalent to 83 nL of whole blood and 4.9 ng DNA) was loaded to investigate the efficiency of the samples where small amounts of blood (or DNA) may be involved. The resulting data, given in Table 1, showed that DNA recovery was higher with the monolith than with the QIAGEN spin column, mirroring with results with pre-purified human genomic DNA. This was an important finding with respect to the forensic application, where analysis of a fraction of a drop of blood on cloth may be required. Under these conditions, the ability to handle low-volume, low-mass samples (a few nanograms of DNA) is paramount We did find, however, that the monolith was less efficient with larger volumes of blood and did not performed up to the standards of the QIAGEN spin column which is designed for larger volumes of blood. The basis of this appears to be rooted in the surface area, pore size and capacity of the monolith, which appears to be less tolerant of the tens of micrograms of protein present per microliter of blood. However, as shown here, for the low volume samples for which this column is designed, these are not issues and the extraction efficiency exceeds that of the commercial kit.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method for preparing a monolithic column comprising the steps of:
   (i) providing a vessel;
   (ii) conditioning the interior surface of said vessel by contacting it with a silica-based flushing solution;
   (iii) preparing a silica-based monomer solution through hydrolysis of a silica monomer;
   (iv) forming a polymerizable mixture by admixing said silica-based monomer solution, an initiator material, and a porogenic solvent;
   (v) introducing said polymerizable mixture into the vessel;
   (vi) initiating the in situ polymerization of said polymerizable mixture by exposing selected portions of the mixture to UV light, thereby forming the UV photo-polymerized silica-based monolithic column within portions of the vessel;
   (vii) flushing a silica-based monomer reagent through said UV photo-polymerized silica-based monolithic column, thereby forming the grafted porous UV photo-polymerized silica-based monolithic column within portions of the vessel.

2. The method of claim 1, wherein said silica-based flushing solution comprises a silica monomer.

3. The method of claim 2, wherein the silica monomer is 3-(Trimethoxysilyl)propyl methacrylate.

4. The method of claim 1, wherein the silica-based monomer solution comprises a silica monomer.

5. The method of claim 4, wherein the silica monomer is selected from a group consisting of 3-(Triethoxysilyl)propyl methacrylate and 3-(Trimethoxysilyl)propyl methacrylate, and 3-[Tris(trimethylsiloxy)propyl methacrylate.

6. The method of claim 4, wherein the silica monomer comprises an acrylate group joined with a silane group.

7. The method of claim 4, wherein the silica monomer comprising an acrylate group joined with a silane group is 3-(Trimethoxysilyl)propyl methacrylate.

8. The method of claim 1, wherein the silica-based monomer solution is present in an amount about 10 vol % to about 50 vol %.

9. The method of claim 1, wherein said initiation is accomplished by a photoinitiator.

10. The method of claim 9, wherein said photoinitiator is selected from the group consisting of benzophenone, dimethoxyacetophenone, xanthone, thioxanthone, and mixtures thereof.

11. The method of claim 1, wherein said porogenic solvent is an organic solvent.

12. The method of claim 1, wherein said organic solvent is selected from the group consisting of hydrocarbons, alcohols, ketones, aldehydes, organic acid esters, soluble polymer solutions, and mixtures thereof.

13. The method of claim 11, wherein said porogenic solvent is toluene.

14. The method of claim 11, wherein the solvent is present in an amount from about 70 vol % to about 90 vol %.

15. The method of claim 1, wherein said silica-based monomer reagent comprises a silica monomer.

16. The method of claim 15, wherein said silica monomer is selected from a group consisting of tetraethylorthosilicate and tetramethylorthosilicate.

17. The method of claim 1, wherein said silica-based monomer reagent is present in an amount from about 50 vol % to 90 vol %.

18. The method of claim 1, wherein said silica-based monomer reagent is flushed through the silica-based monolith column for about 15 minutes to 120 minutes.

19. The method of claim 1, wherein said vessel is a capillary, pipette, tube, or microchannel on a microfludic device.

20. The method of claim 1, wherein the vessel is on a microchip.

* * * * *

UNITED STATES PATENT AND TRADEMARK OFFICE
CERTIFICATE OF CORRECTION

PATENT NO. : 9,044,735 B2  
APPLICATION NO. : 12/892618  
DATED : June 2, 2015  
INVENTOR(S) : Jian Wen et al.

Page 1 of 1

It is certified that error appears in the above-identified patent and that said Letters Patent is hereby corrected as shown below:

In The Specification  
In column 1, line 12, after "entirety.", insert --¶STATEMENT OF GOVERNMENT INTEREST  
This invention was made with government support under HG002613 awarded by the National  
Institutes of Health. The government has certain rights in the invention.--, therefor Signed and Sealed this  
Twenty-sixth Day of April, 2016

Michelle K. Lee  
*Director of the United States Patent and Trademark Office*